United States Patent [19]
Atchison et al.

[11] 3,852,177
[45] Dec. 3, 1974

[54] METHOD OF RADIATION CROSS-LINKING OLEFIN POLYMERS CONTAINING ACRYLATE CROSS-LINKING PROMOTERS

[75] Inventors: George J. Atchison; Donald J. Sundquist, both of Midland, Mich.

[73] Assignee: The Dow Chemical Company, Midland, Mich.

[22] Filed: Oct. 2, 1972

[21] Appl. No.: 293,787

[52] U.S. Cl.... 204/159.17, 260/2.5 H, 260/2.5 HA, 260/2.5 E, 260/878, 260/885
[51] Int. Cl............................. B01j 1/10, B01j 1/12
[58] Field of Search ....... 204/159.17; 260/94.9, 878

[56] References Cited
UNITED STATES PATENTS
| | | | |
|---|---|---|---|
| 3,125,546 | 3/1964 | Pinner et al. | 204/159.17 |
| 3,542,661 | 11/1970 | Klopfer et al. | 204/159.17 |
| 3,717,559 | 2/1973 | Oyama et al. | 204/159.17 |

Primary Examiner—Murray Tillman
Assistant Examiner—Richard B. Turer
Attorney, Agent, or Firm—Ralph M. Mellom

[57] ABSTRACT

A cross-linked olefin polymer is produced by applying high energy ionizing radiation to a mixture of the olefin polymer and a cross-link promoter such as trimethylolpropane triacrylate in an amount such that the mixture absorbs a radiation dose of between about 0.1 and about 1 megarad. The cross-link promoter serves to enhance the cross-linkability of the olefin polymer such that a high degree of cross-link is achieved with a small radiation dose. The mixture can also contain a foaming agent which can be made to expand and thereby produce a cellular product. Products fashioned of the cross-linked polymer have improved dimensional stability and are more resistant to thermal shrinkage and distortion. The cross-linked olefin polymer can be fashioned into a variety of products having utility in many fields including the packaging and construction industries.

3 Claims, No Drawings

METHOD OF RADIATION CROSS-LINKING OLEFIN POLYMERS CONTAINING ACRYLATE CROSS-LINKING PROMOTERS

This invention relates to methods for producing cross-linked olefin polymers. In one aspect, this invention relates to methods for cross-linking an olefin polymer by means of high energy ionizing radiation wherein a cross-link promoter is employed to enhance the cross-linking reaction. In another aspect, this invention relates to methods of producing cellular products of a polyolefin which is cross-linked by high energy ionizing radiation in the presence of a polyfunctional monomer which enhances the cross-linking reaction.

Cross-linked olefin polymers exhibit better dimensional stability and higher tensile strength than the corresponding non-cross-linked polymer. These properties of the polymer are important in determining whether or not the polymer is suitable for use in a particular application. As a general rule, when the polymer is shaped into an article such as a film, sheet, fiber, tube, or coating on wire or the like it is desirable that the polymer have maximum dimensional stability, tensile strength, and resistance to thermal distortion.

The prior art is replete with techniques for producing cross-linked polymers. These techniques can be broadly classified into chemical cross-linking and radiation cross-linking. In the chemical cross-linking process, a cross-linking agent such as dicumyl peroxide is blended with the polymer and heat is applied to promote the cross-linking reaction. In the radiation cross-linking process, the polymer is irradiated with high energy ionizing radiation. While the mechanism of the interaction between the ionizing radiation and the polymer is perhaps subject to speculation, the resulting transfer of energy to the polymer produces cross-linking between the individual polymer chains. The prior art also teaches that the cross-linking reaction can be enhanced in both processes by the use of a so-called sensitizer or cross-link promoting agent. Cross-link promoters which are recognized in the art for the purpose of enhancing the cross-linking reaction are normally polyfunctional monomers such as divinylbenzene, triethylene glycol diacrylate, diallyl maleate, and the like. While these polyfunctional monomers do in fact promote the cross-linking reaction in the sense that when they are used a given degree of cross-link can be achieved with less cross-linking agent or with a lower radiation dose, the cross-linking promoters suggested for use in cross-linking by ionizing radiation are not completely satisfactory in terms of enhancing the cross-linking reaction at low radiation doses.

According to this invention, these and other disadvantages of the prior art techniques for cross-linking an olefin polymer by high energy ionizing radiation are overcome by means of a cross-link promoter selected from the group consisting of trimethylolpropane triacrylate, trimethylolpropane trimethacrylate, pentaerythritol tetraacrylate, and pentaerythritol tetramethacrylate to enhance the cross-linkability of the olefin polymer. It has been discovered that the cross-link promoters of this invention are surprisingly and unexpectedly more effective, as compared to the cross-link promoters of the prior art, in enhancing the cross-linking reaction of an olefin polymer by relatively low doses of high energy ionizing radiation.

Accordingly, it is an object of this invention to provide a method of cross-linking an olefin polymer by high energy ionizing radiation.

Another object of this invention is to provide an improved method of cross-linking olefin polymers with high energy ionizing radiation to produce improved cross-linked polymers with low energy requirements.

A further object of this invention is to provide a method for increasing the efficiency of a method for cross-linking olefin polymers by high energy ionizing radiation.

Yet another object of the invention is to produce cellular products of an olefin polymer which is cross-linked by high energy ionizing radiation.

These and other objects of the invention will become apparent to one skilled in the art after studying the following detailed description and the appended claims.

According to the invention, a cross-linked olefin polymer is produced by the method which comprises applying high energy ionizing radiation to a mixture of the olefin polymer and one or more of the cross-link promoters noted above. The high energy ionizing radiation is applied in an amount such that the mixture absorbs a radiation dose of between about 0.1 and about 1 megarad. While the effect of using the cross-link promoters of this invention to enhance the cross-linking reaction are realized throughout a rather broad radiation dose, the surprising and unexpected behavior of this class of cross-link promoters is more pronounced, as compared to the prior art cross-link promoters, at a radiation dose of between about 0.1 and about 1 megarad.

The cross-link promoter is generally used in an amount sufficient to enhance the cross-linking reactions of the olefin polymer. For obvious economic reasons, it is usually desirable to employ not more of the cross-link promoters than is necessary to achieve the degree of cross-link desired. The cross-link promoter can be present in the mixture with the olefin polymer in an amount up to about 10 weight percent based upon the weight of the mixture and preferably in an amount between about 0.1 and about 10 weight percent.

Olefin polymers which can be cross-linked by the method of the invention include those polymers prepared from a 1-olefin having between 2 and 8 carbon atoms per molecule. Exemplary olefin polymers include polyethylene, polypropylene, polybutene-1, and the like. The olefin polymer can also be a copolymer of a 1-olefin of the type described above and a copolymerizable monomer such as vinyl acetate, ethyl acrylate, and the like.

The trimethylolpropane triacrylate and trimethylolpropane trimethylacrylate cross-link promoters of the invention can be prepared by processes well-known in the art or they can be obtained commercially from Sartamer Resins, Inc., Essington, Pennsylvania. The pentaerythritol tetraacrylate and pentaerythritol tetramethacrylate cross-link promoters can also be prepared by processes well-known in the art or they can be obtained commerically from Polysciences, Inc., Warrington, Pennsylvania.

The high energy ionizing radiation which is employed to effect the cross-linking reaction can be obtained from any suitable source such as an atomic pile, a resonant transformer accelerator, a Van de Graaff electron accelerator, a Linac electron accelerator, a betatron, a synchrotron, a cyclotron, or the like. Radiation from these sources will produce ionizing radiation such as electrons, protrons, neutrons, deuterons, gamma rays, X rays, alpha particles, and beta particles.

The cross-linking reaction is conveniently effected at room temperature, but it can be conducted at depressed or elevated temperatures if desired. It is also within the spirit and scope of the invention to effect the cross-linking reaction within the confines of an inert atmosphere to prevent oxidation of an olefin polymer.

The method of the invention is particularly suited for producing a cellular product of a cross-linked olefin polymer. In this embodiment, the mixture of the olefin polymer and the cross-link promoter includes a foaming agent which will expand and produce a multitude of cells in the cross-linked olefin polymer product. The cellular product can be in the form of a film, sheet, fiber, tube, wire coating, or the like. Any suitable apparatus can be employed for producing the product desired. For example, when the product is to be a cross-linked cellular sheet, an extruder having a slot die can be used to form the mixture of olefin polymer, cross-link promoter, and foaming agent into a web. The web can then be subjected to high energy ionizing radiation to effect the cross-linking reaction. This is normally accomplished before expansion of the foaming agent. The foaming agent is then caused to expand and thereby transform the web into a cellular sheet.

A variety of different foaming or blowing agents can be employed in this embodiment of the invention. The selection of a blowing agent will be dictated by its performance in a particular process. The so-called volatile type blowing agents, such as a halogenated fluorine-containing hydrocarbon, can be used to produce a cellular product in conjunction with an extrusion process. Exemplary volatile foaming agents which can be employed include dichlorodifluoromethane, dichlorotetrafluoroethane, monochlorodifluoromethane, perfluorocyclobutane, and the like. The volatile blowing agent is normally introduced into the extruder after the olefin polymer has been plastified. The so-called decomposable blowing agents, such as azodicarbonamide, can also be employed to produce the cellular product. Other exemplary decomposable foaming agents which can be employed in the practice of the invention include ammonium carbonate, azobisisobutyronitrile, hydrazodicarbonamide, and the like. The decomposable blowing agent is usually preblended with the olefin polymer and the cross-link promoter prior to being introduced into a plastifying apparatus. The use of a decomposable foaming agent has the advantage of allowing better control of the foaming step. Thus, for example, when the product is in the form of a cellular sheet produced by an extruder as described above, the web can be formed and the olefin polymer cross-linked at a temperature below the decomposition temperature of the foaming agent. Heat as is necessary to decompose the foaming agent can then later be applied to the web to produce the cellular sheet. The same technique can be employed for producing products other than sheets.

The amount of foaming agent which is employed will depend upon such factors as the density desired in the cellular product, the size and shape of the cellular product, the type of olefin polymer, and the like. In general, the foaming agent is present in an amount between about 0.1 and about 20 weight percent based upon the total weight of the mixture including the foaming agent, the olefin polymer, and the cross-link promoter.

The products produced according to the invention can also contain coloring agents, stabilizers, fillers, and the like. In addition, the cellular products produced by the invention can contain nucleating agents, cell size control agents, and the like.

The following examples are illustrative of various techniques for producing a cross-linked polymer by the method of the invention.

EXAMPLE I

Samples suitable for cross-linking by irradiation were prepared by blending a mixture of low density polyethylene granules and a cross-link promoter in a Brabender mixer. The blending technique involved charging the Brabender with about 60 grams of the mixture over a period of about 3 minutes while rotating the Brabender at a speed of about 25 r.p.m. At the end of the charging step, the Brabender was operated at about 63 r.p.m. for about 2 minutes at a temperature of about 135°C to complete the blending. The resulting blend was then formed into discs each having a thickness of about one-eighth inch and a diameter of about 2 inches by molding at a temperature of about 130°C between heated platens. Irradiation samples were then cut from each of the several discs by means of an arbor press and a punch having a three-eighths inch diameter. The relative amounts of the polyethylene and the cross-link promoter in each mixture are indicated in Table I below. The several three-eighths inch diameter discs were then subjected to high energy ionizing radiation with a scanned beam current of about 122 microamps at 2 million electron volts from a Van de Graaff accelerator having an aluminum filter of 0.19 gram per sq. cm. between the beam exit window and the sample. A conveyor was used to support and move the samples through the beam at a speed of about 3.4 cm. per second. A beam current of 122 microamps produces a radiation dose of about 0.25 megarad with each pass through the beam. Multiple passes were used in some instances to obtain the desired radiation dose. The radiation dose which each sample absorbed is reported in Table I. Control samples from the same lot of polyethylene were molded into discs without any cross-link promoter and irradiated with the results reported in Table I. The gel fraction of each sample was determined by extraction with boiling toluene. The gel fraction of each sample, which indicates the degree of cross-link, is reported in Table I.

TABLE I

| Run No. | Type of Cross-link Promoter | Amount of Cross-link Promoter (wt. percent) | Gel (wt. percent) at Indicated Radiation Dose (megarads) | | | | |
|---|---|---|---|---|---|---|---|
| | | | 0 | 0.25 | 0.5 | 0.75 | 1.0 |
| 1 | TMPTA | 2 | 0.14 | 38.0 | 40.5 | 43.1 | 45.4 |
| 2 | TMPTA | 5 | 0.10 | 43.3 | 44.2 | 45.3 | 47.1 |

TABLE I—Continued

| Run No. | Type of Cross-link Promoter | Amount of Cross-link Promoter (wt. percent) | Gel (wt. percent) at Indicated Radiation Dose (megarads) | | | | |
|---|---|---|---|---|---|---|---|
| | | | 0 | 0.25 | 0.5 | 0.75 | 1.0 |
| 3 | TMPTM | 2 | 0.60 | 40.2 | 43.8 | 47.4 | 49.2 |
| 4 | TMPTM | 5 | 0.46 | 35.9 | 42.4 | 47.4 | 50.4 |
| C1 | None | — | 0.36 | 0.66 | 2.47 | 11.9 | 15.8 |

TMPTA - Trimethylolpropane triacrylate
TMPTM - Trimethylolpropane trimethacrylate As indicated by the data reported in Table I the trimethylolpropane triacrylate and the trimethylolpropane trimethacrylate cross-link promoters are very effective in promoting the cross-link reaction at relatively low radiation doses.

EXAMPLE II

Low density polyethylene in powder form and having a melt index of about 0.2 as determined by ASTM Test Procedure D 1238–57 T was blended with trimethylolpropane trimethacrylate in a ball mill jar until a uniform mixture was obtained. The resulting blend was then formed into discs each having a thickness of about one-eighth inch and a diameter of about 2 inches by molding at a temperature of about 130°C between heated platens. Samples suitable for irradiation were then cut from the molded discs by means of an arbor press and a punch having a diameter of three-eighths inch. Control samples of the same type polyethylene were prepared by the technique described above without any cross-link promoter. Several other control samples were also prepared by the technique described above with the same type polyethylene and with each of diallyl fumarate, allyl methacrylate, triallyl cyanurate, and triallyl isocyanurate. The relative amounts of the polyethylene and the cross-link promoter in each of the blends are indicated in Table II below. The several three-eighths inch diameter samples were then subjected to high energy ionizing radiation by the same technique as outlined in Example I. The gel fraction of each of the samples was then determined by extraction with boiling toluene. The gel fraction of each sample, which indicates the degree of cross-link, is reported in Table II below.

As indicated by the data reported in Table II, the trimethylolpropane trimethylacrylate is very effective in enhancing the irradiation cross-linking reaction of polyethylene.

EXAMPLE III

To illustrate the suitability of the invention for producing cellular products, low density polyethylene was melt blended at a temperature of about 140°C by means of a Brabender Plasticorder with azodicarbonamide foaming agent, trimethylolpropane triacrylate cross-link promoter, and zinc oxide. The azodicarbonamide was present in the blend in an amount equal to about 15 weight percent based upon the weight of the polyethylene. The trimethylolpropane triacrylate was present in the blend in an amount equal to about 0.5 weight percent based upon the weight of the polyethylene. The zinc oxide, which was used to lower the decomposition temperature of the foaming agent, was present in the blend in an amount equal to about 5 weight percent based upon the weight of the polyethylene. The resulting blend was then compression molded at a temperature of about 140°C into sheets about one-eighth inch thick. Samples were cut from the sheet and irradiated by the technique described in Example II. In a control run, one of the samples was not irradiated. In other control runs, the samples were irradiated to provide absorbed radiation doses greater than 1 megarad. The gel fraction of the irradiated samples was then determined by extraction of a portion of each sample with decahydronaphthalene at 130°C. The remainder of each sample was then foamed by immersion in silicone oil at a temperature of 250°C. The foaming characteristics during foaming and the resistance to thermal col-

TABLE II

| Run No. | Type of Cross-link Promoter | Amount of Cross-link Promoter (wt. percent) | Gel (wt. percent) at Indicated Radiation Dose (megarads) | | | | | | | | |
|---|---|---|---|---|---|---|---|---|---|---|---|
| | | | 0 | 0.2 | 0.25 | 0.4 | 0.5 | 0.6 | 0.75 | 0.8 | 1.0 |
| 1 | TMPTM | 2 | 0.2 | | 23.5 | | 28.1 | | 33.2 | | 39.2 |
| 2 | TMPTM | 5 | 0.1 | | 29.8 | | 37.4 | | 42.7 | | 46.5 |
| 3 | TMPTM | 10 | | | | | | | | | 54.2 |
| C1 | None | — | 0.0 | | 0.2 | | 0.6 | | 10.1 | | 15.1 |
| C2 | DAF | 2 | 0.2 | | | | | | | | 38.8 |
| C3 | DAF | 5 | 0.3 | | | | | | | | 31.3(a) |
| C4 | DAF | 10 | 0.2 | | | | | | | | 26.8(b) |
| C5 | AM | 2 | 0.2 | | 14.5 | | 24.4 | | 30.4 | | 31.8 |
| C6 | AM | 5 | 0.1 | | 13.8 | | 22.5 | | 30.0 | | 34.0 |
| C7 | AM | 10 | 0.1 | | | | | | | | 35.7 |
| C8 | TAC | 2 | 0.1 | | 0.1 | | 2.3 | | 1.6 | | 14.9 |
| C9 | TAC | 5 | 0.1 | | 0.1 | | 2.0 | | 3.5 | | 6.4(a) |
| C10 | TAC | 10 | 0.3 | | | | | | | | 6.6(b) |
| C11 | TAI | 5 | 0.4 | 7.6 | | 28.4 | | 37.3 | | 46.8 | 51.9 |

TMPTM - Trimethylolpropane trimethacrylate
DAF - Diallyl fumarate
AM - Allyl methacrylate
TAC - Triallyl cyanurate
TAI - Triallyl isocyanurate
(a) - Average of two measurements
(b) - Average of three measurements
In Run No. C11 the beam current was 49 microamps thereby resulting in a radiation dose of 0.1 megarad per pass through the beam.

lapse after foaming of each sample was determined by means of the foam volume recording apparatus described by L. C. Rubens in the Journal of Cellular Plastics, Vol 1, No. 2 (April, 1965) page 314. This apparatus directly plots the volume of the foam against the time elapsed from immersion of the sample such that the number of times expansion is continuously recorded during the time the sample is in the silicone oil. Table III below sets forth the foam volume obtained with each sample.

TABLE III

| Run No. | Radiation Dose (megarad) | Gel (wt. percent) | Foam Volume (number of times expanded) at Indicated Foaming Time (seconds) | | | | Maximum Foam Volume Achieved at Time Indicated in Parenthesis (seconds) |
|---|---|---|---|---|---|---|---|
| | | | 30 | 60 | 90 | 120 | |
| 1 | 0.1 | 27 | 6 | 53 | 40 | 40 | 53 (60) |
| 2 | 0.25 | 27 | 7 | 50 | 40 | 40 | 52 (55) |
| 3 | 0.5 | 31.3 | 7 | 61 | 77 | 76 | 77 (70) |
| 4 | 1.0 | 35.4 | 7 | 61 | 74 | 73 | 75 (70) |
| C1 | 2.0 | 40.7 | 7 | 56 | 45 | 35 | 65 (65) |
| C2 | 3.0 | 51.5 | 7 | 47 | 21 | —* | 47 (60) |
| C3 | 0 | 5 | 3 | 8 | 7 | 6 | 9 (50) |

*Not determined but slope of curve for this run indicates that foam volume would be less than 15 at foaming time of 120 seconds.

As indicated by the data reported in Table III, the foam volume in Run No.'s 1 through 4 and particularly Run No.'s 3 and 4 remains substantially constant after the maximum foam volume is achieved. This shows that cellular products produced by the method of the invention exhibit good resistance to thermal collapse. In Run No.'s C1 and C2, which are obtained by methods outside the scope of the invention, the foam has poor resistance to thermal collapse. The maximum foam volume of the cellular products produced by the invention is also much higher than the maximum foam volume of the cellular products obtained by Runs C1 through C3.

EXAMPLE IV

Low density polyethylene and the cross-link promoters indicated in Table IV below were blended together and molded into samples by the technique described in Example I. The cross-link promoter was present in the blends in an amount equal to about 0.25 weight percent based upon the weight of the polyethylene. Control samples were also prepared without any cross-link promoter. The samples were then irradiated by the technique outlined in Example I except with a beam current of 49 microamps was used. This produced a radiation dose of 0.1 megarad with each pass through the beam. The gel fraction of the samples was then determined by extraction with decahydronaphthalene at 130°C. The gel fraction of each sample, which indicates the degree of cross-link, is reported in Table IV below.

As indicated by the data in Table IV, the pentaerythritol tetraacrylate and the pentaerythritol tetramethacrylate cross-link promoters are very effective in enhancing the irradiation cross-linking of polyethylene at relatively low doses of radiation.

The instant invention is useful in producing cross-linked olefin polymers having improved dimensional stability and tensile strength, particularly at elevated temperatures, when compared to the corresponding non-cross-linked polymer. The invention can thus be employed to cross-link a variety of products fabricated or shaped from the olefin polymer. Illustrative useful products include fibers, films, tubes, sheets, coated wires, pipe, and the like.

Although the invention has been described in considerable detail, such description is for the purpose of illustration only and should not be construed as limiting of the invention.

What is claimed is:

1. A method of producing cross-linked polyethylene comprising applying high energy ionizing radiation to a mixture of polyethylene, a foaming agent, and a cross-link promoter selected from the group consisting of trimethylolpropane triacrylate, trimethylolpropane trimethacrylate, pentaerythritol tetraacrylate, and pentaerythritol tetramethacrylate in an amount such that the mixture absorbs a radiation dose of between about 0.1 and about 1 megarad, said cross-link promoter being present in said mixture in an amount up to about 10 weight percent based upon the weight of said mixture.

2. A method according to claim 1 wherein said foaming agent is of a type which decomposes and evolves a gas by the application of heat.

3. A method according to claim 2 which includes the step of applying heat to the resulting cross-linked polyethylene to cause said foaming agent to decompose and thereby produce a cellular polyethylene product.

* * * * *

TABLE IV

| Run No. | Type of Cross-link Promoter | Gel (wt. percent) at Indicated Radiation Dose (megarads) | | | | | |
|---|---|---|---|---|---|---|---|
| | | 0 | 0.1 | 0.2 | 0.4 | 0.8 | 1.6 |
| 1 | PENTA | 5.4 | 21.1 | 35.9 | 38.9 | 33.9 | 41.9 |
| 2 | PENTMA | 5.0 | 5.7 | 5.7 | | 17.7 | 43.3 |
| C1 | None | 2.9 | 6.0 | 2.8 | 3.6 | 3.4 | 38.5 |

PENTA - Pentaerythritol tetraacrylate
PENTMA - Pentaerythritol tetramethacrylate

UNITED STATES PATENT OFFICE
CERTIFICATE OF CORRECTION

Patent No. 3,852,177      Dated December 3, 1974

Inventor(s) George J. Atchison et al

It is certified that error appears in the above-identified patent and that said Letters Patent are hereby corrected as shown below:

Column 2, line 53, the word "trimethylacrylate" should be --trimethacrylate--.

Column 6, line 13, the word "trimethylacrylate" should be --trimethacrylate--.

Signed and sealed this 15th day of July 1975.

(SEAL)
Attest:

RUTH C. MASON
Attesting Officer

C. MARSHALL DANN
Commissioner of Patents
and Trademarks